United States Patent Office 3,358,712
Patented Dec. 19, 1967

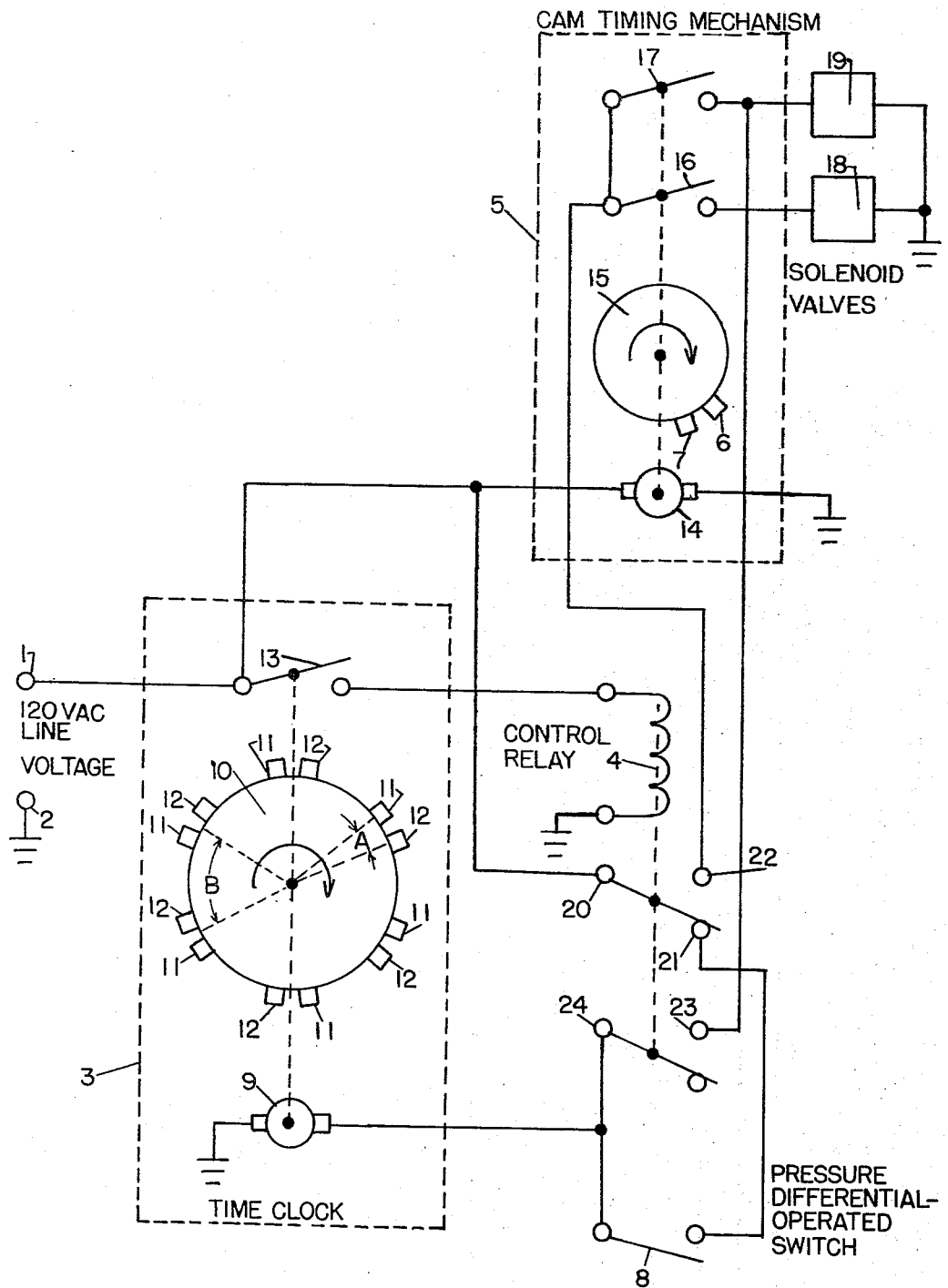

3,358,712
WATER SOFTENER CONTROL APPARATUS
Donald F. Lane, Minneapolis, Minn.
(13736 E. Wellington Crescent, Burnsville, Minn. 55378)
Filed Sept. 30, 1965, Ser. No. 491,647
4 Claims. (Cl. 137—624.18)

This invention relates to water softener control apparatus and more especially to a water softener control apparatus of the demand type wherein the mineral bed of the water softener is regenerated as required as compared with conventional time-controlled systems wherein the mineral bed is regenerated periodically whether regeneration is required or not.

Regeneration methods are known wherein the mineral bed of a water softener is regenerated periodically through the use of a timeclock where the timeclock controls solenoid-operated valves and the valves inturn control the regeneration cycle. The timeclock in such a system is adjusted to operate the valves periodically and is set depending upon the average consumption of soft water.

Regeneration methods are also known wherein the mineral bed of a water softener is regenerated as needed through the use of a pressure-operated valve which supplies water to a brine tank at a rate determined by the consumption of soft water. When the brine in the tank reaches a pre-determined level, a float-operated switch triggers a regeneration cycle. Another method of controlling the operation of a water softener involves determining the pH value of the softener effluent and controlling the cycle of operation in accordance therewith.

While water softener regeneration methods of the timeclock type are effective, their use is limited where the consumption of soft water varies from week to week and the time-controlled system may cause a regeneration cycle to occur either before or after it is necessary.

The regeneration method using the pressure operated valve, brine tank, and float-operated switch eliminates the disadvantage of the timeclock-operated system; however, it is expensive to maintain because of the corrosive effect of water flowing through the pressure-operated valve; furthermore, the initial cost of this system is high. Similarly, the advantages obtained by the pH determining system are largely outweighed by its initial expense and maintenance costs.

The general object of the invention is to improve water softener control apparatus. Other objects of the invention are: to provide improved water softener control apparatus including means for initiating a regeneration cycle after a given quantity of water has passed through the water softener mineral bed; to provide apparatus of this type including pressure differential sensing means and timeclock means that is switch operated to initiate and terminate a regeneration cycle; to provide in apparatus of this type means for preventing regeneration during the period when the consumption of soft water is at a maximum, and, in general, to provide an improved water softener control apparatus that is highly versatile and dependable in operation, simple and inexpensive to construct, install, and maintain, and rugged and long-wearing in service.

These and other objects and advantages of the invention will become more fully apparent from a consideration of the following detailed description taken in conjunction with the accompanying drawing wherein a schematic diagram of the invention is shown by way of illustration and not by way of limitation.

Briefly stated, this invention concerns a pressure differential-operated switch and a control circuit which initiates a regeneration cycle after a given quantity of water has passed through the water softener mineral bed. The contacts of the pressure differential-operated switch are connected in series with the motor of a conventional twenty-four-hour timeclock. When hard water passes through the water softener mineral bed, a pressure differential exists between the water softener input and output lines, and the contacts of the pressure differential-operated switch close. When these contacts close, the timeclock starts accumulating time and after a preset interval the timeclock switch contacts close to trigger a conrol circuit and initiate a regeneration cycle. Most automatic water softeners are controlled by cam-operated timing mechanisms. These mechanisms control solenoid-operated valves and the valves control the regeneration cycle. In order to prevent water softener regeneration cycles from occurring when consumption of soft water is at a maximum, i.e. during daylight hours, the mechanisms are designed such that regeneration occurs in the early morning hours. These cam-operated timing mechanisms consist of a clock motor that drives a shaft to which a twenty-four-hour time-dial and cam are attached, two switches operated by the cam, and a calendar wheel-operated switch. The twenty-four-hour time dial provides a means for setting the mechanism to the correct time and it advances the calendar wheel once every twenty-four hours. The cam controls the operation of two switches and the switches operate two solenoid-controlled valves. The solenoid-controlled valves are employed to control the regeneration cycle. The calendar wheel-operated switch supplies line voltage to the common terminals of both cam-operated switches on the day or days of the week during which a regeneration cycle is desired. Seven-day calendar wheels are contained in most mechanisms. These wheels contain seven threaded holes corresponding to the days of the week and accommodate machine screws. The machine screw(s) extending through the holes in the calendar wheel operate a switch on the day or days of the week when a regeneration cycle is desired. The twenty-four-hour timedial advances the calendar wheel once every twenty-four hours and if a screw in the calendar wheel operates the calendar wheel switch, a regeneration cycle follows early the next morning. (Calendar wheel advancement usually occurs before midnight on the day before the selected renegeration time.) The contacts of the cam-operated switches make and break every morning; however, line voltage is only supplied to these contacts on the day or days corresponding to the calendar wheel threaded holes containing machine screws.

This invention eliminates the need for a calendar wheel and its associated switch but utilizes the other components contained in the cam-operated timing mechanism since a regeneration cycle occurring in the early morning hours is still desired. One of the advantages of this invention is that of utilizing the existing cam-operated timing mechanism contained in most automatic water softeners.

As shown in the drawing numerals 1 and 2 designate terminals connected to a source of 120 v. AC line voltage, which is required for the operation of the control circuit and the two cam-controlled, solenoid-operated valves that control regeneration. The control circuit consists of a conventional twenty-four-hour timeclock system 3, a control relay 4, a cam-operated timing mechanism 5, two solenoid-operated valves 18 and 19, and a pressure differential-operated switch 8.

The twenty-four-hour timeclock system 3, includes a clock motor 9 that drives a gear train (not shown), a twenty-four-hour time dial 10 driven by the gear train, six adjustable off tabs 11, six adjustable on tabs 12, and a switch 13. The adjustable off-on tabs 11 and 12, respectively, operate the switch 13. These tabs are locked on the twenty-four-hour time dial 10. Adjacent on-off tabs are separated by an angular segment (indicated by the reference character A) corresponding to a time interval of slightly less than fifteen minutes, and each pair of on-off tabs is separated by an angular segment (indicated by the reference character B) corresponding to a time interval of four hours. The twenty-four-hour time dial 10 is initially set such that switch contacts 13 are open; hence, the contacts of switch 13 close after three hours and forty-five minutes of motor 9 running time and open slightly less than fifteen minutes later.

The control relay 4 interrupts the operation of clock motor 9 and triggers a regeneration cycle; in addition, it provides a means of resetting the twenty-four-hour time dial 10 during the final phase of the regeneration cycle.

The cam-operated timing mechanism 5, consists of a motor 14 that drives a gear train (not shown), a cam 15, driven by the gear train, and two switches 16 and 17 that are operated by tabs 6 and 7 respectively. The tabs are attached to the cam 15. The motor 14 is connected to line voltage terminals 1 and 2 and hence operates continuously. The cam 15 is adjusted such that tab 6 causes switch 16 contacts to close at 4 a.m. and open at 5 a.m. Tab 7 causes switch 17 contacts to close at 5 a.m. and open at 5:15 a.m. The cam 15 operates the switches 16 and 17 once every twenty-four hours.

The solenoid-operated valve 18 and 19 are operated when the contacts of switches 16 and 17, respectively, close provided the control relay 4 is energized. These valves, operated by the cam-operated timing mechanism 5, control the regeneration cycle.

The pressure-differential-operated switch 8 detects the flow of water through the water softener mineral bed by sensing the pressure "drop" between the water softener input (hard water) and output (soft water) lines. The pressure "drop" is a result of head loss, pipe friction, etc., within the water softener mineral bed, solenoid-operated valves, and pipe connections.

Operation of the control system is as follows: When hard water passes through the water softener mineral bed, a pressure "drop" occurs between the water softener input (hard water) and output (soft water) lines. The pressure differential-operated switch 8, connected between these lines senses the pressure "drop" and its contacts close. When the pressure differential-operated switch 8 contacts close, 120 v. AC line voltage is supplied to the twenty-four-hour timeclock motor 9; and the twenty-four-hour time dial 10 begins accumulating time. Accumulation of time continues as more water is drawn through the water softener mineral bed. After a preset interval (in this example, three hours and forty-five minutes), the switch contacts 13 are closed and the control relay 4 is energized. When the control relay 4 is energized, its normally closed contacts 20 and 21 open and any further operation of the clock motor 9 is interrupted. In addition, normally open contacts 20 and 22 close and 120 v. AC line voltage is supplied to the cam-operated switches 16 and 17. At 4 a.m. of the morning following the operation of the control relay 4, the regeneration cycle begins. The tab 6, attached to cam 15, causes switch 16 contacts to close, the solenoid-operated valve 18 is energized, and upflow backwashing and brining begin. At 5 a.m., the tab 6 causes the switch 16 contacts to open, the solenoid-operated valve 18 is de-energized, the tab 7 causes the switch 17 contacts to close, the solenoid-operated valve 19 is energized, and a fast down rinse occurs. At 5:15 a.m., the tab 7 causes switch 17 contacts to open, the solenoid-operated valve 19 is de-energized and the regeneration cycle is complete. During the fifteen-minute interval (5–5:15 a.m.), 120 v. AC from the solenoid-operated valve 19 is supplied to clock motor 9 through the normally open control relay 4 contacts 23 and 24. The clock motor 9 runs until contacts of switch 13 open. When these contacts open (at 5:15 a.m.), the control relay 4 is de-energized, the voltage supplied to the two cam-operated switches 16 and 17 is interrupted, and the solenoid-operated valve 19 is de-energized. The circuit is now reset for the next cycle.

Adjustment of the angular segment B between adjacent pairs of off-on tabs 11 and 12 allows the control circuit to be readily adapted to water of varying hardness and to water softeners of various capacities.

Adjustment of the closure pressure of the pressure differential-operated switch contacts allows the control apparatus to be used with water softeners having various head losses and pipe friction.

It is evident that changes within the skill of those versed in the art may be made without departing from the spirit of the invention. In many instances, features may be added; in others, features may be omitted. Where the same or similar results may be achieved by the use of equivalents, substitution of the equivalent may be made without departing from the inventive concept.

It is intended that the patent shall cover, by summarization in the appended claims, all features of patentable novelty residing in the invention.

I claim:

1. In a water softener regeneration control including solenoid-actuated valve means for regeneration, and means including timing means for energizing said solenoid valve means, the combination of:
   an electrically operated timeclock device,
   a pressure differential switch in series with said clock device,
   a control relay operable when deenergized to complete the circuit between said pressure differential switch and its source of current and when energized to supply voltage to said means for energizing said solenoid valve means and also complete a circuit between said solenoid valve means and said timeclock device to reset the same during the final phase of the regeneration cycle, and
   switch means in series with and actuated by said timeclock device according to a predetermined time sequence for intermittently supplying voltage to said control relay.

2. The device described in claim 1 wherein said timeclock device includes a clock motor, a time dial driven by said motor, a plurality of off tabs, and a plurality of on tabs, said tabs being operable to operate said switch means and being adjustable to provide varying time increments for energizing said control relay.

3. The device described in claim 2 wherein said tabs are arranged in pairs of adjacent on and off tabs, the adjacent on and off tabs being separated from each other by a time increment of less duration than the time increment separating adjacent pairs of on and off tabs.

4. In apparatus for controlling the regeneration cycle of a water softener including solenoid-actuated valve means for upflow backwashing, brining and downrinsing of the system, and electrically operated cam timing mechanism including switch means for opening and closing said valve means according to a predetermined time sequence, the combination of:
   electrically operated timeclock means,
   pressure differential-operated switch means in series with said timeclock means operable to energize the same when water is passing through the softener,
   a control relay including a set of normally closed contacts in series with said pressure differential-operated switch, a set of normally open contacts in series with the switch means of said cam timing mechanism, and a set of normally open contacts in series with one of the solenoids in said solenoid-actuated valve means and said timeclock means, and
   timeclock-actuated switch means between said control relay and said timeclock means operable to energize and de-energize said control relay according to a predetermined timing sequence,
   said control relay being operable when energized by said last-mentioned means to interrupt said pressure differential-operated switch means, energize the switch means of said cam timing mechanism whereby to operate said solenoid-actuated valve means according to the time sequence of said cam timing mechanism, and reset said timeclock means during the final phase of the regeneration cycle.

References Cited

UNITED STATES PATENTS

| | | | |
|---|---|---|---|
| 2,051,155 | 8/1936 | Staegemann | 137—625.46 X |
| 2,689,218 | 9/1954 | Waugh | 137—624.13 X |
| 3,160,008 | 12/1964 | Gestler | 137—624.18 X |

ALAN COHAN, *Primary Examiner.*